United States Patent [19]
López-Gómez et al.

[11] Patent Number: 5,706,851
[45] Date of Patent: Jan. 13, 1998

[54] PLUG VALVE

[75] Inventors: Ronald Víctor Manuel López-Gómez, San Nicolas de los Garza; Cesar Humberto Valdez-Chapa, Monterrey; Manuel Ramírez-Mundo, Guadalupe, all of Mexico

[73] Assignee: Hyisa S.A. de C.V., San Nicolas de Los Garza, Mexico

[21] Appl. No.: 562,680

[22] Filed: Nov. 27, 1995

[51] Int. Cl.⁶ .................. F16K 27/04; F16K 49/00
[52] U.S. Cl. .................. 137/246.22; 137/340; 137/375; 251/309
[58] Field of Search .................. 137/246.22, 340, 137/375; 251/309, 312

[56] References Cited

U.S. PATENT DOCUMENTS

| | | | |
|---|---|---|---|
| 1,797,027 | 3/1931 | Smith | 251/316 X |
| 2,121,686 | 6/1938 | Currie | 137/340 X |
| 2,836,388 | 5/1958 | Rakus | 251/309 X |
| 2,954,961 | 10/1960 | Stogner et al. | 251/312 |
| 3,133,722 | 5/1964 | McGuire et al. | 251/309 |
| 3,459,213 | 8/1969 | Schenck et al. | 137/340 |
| 3,710,808 | 1/1973 | Celada et al. | 137/587 X |
| 4,261,385 | 4/1981 | Worley | 137/340 |
| 4,498,498 | 2/1985 | Martinez-Vera et al. | 137/246.22 X |
| 4,506,696 | 3/1985 | von Pechmann | 251/309 X |

Primary Examiner—Gerald A. Michalsky
Attorney, Agent, or Firm—Curtis, Morris & Safford, P.C.

[57] ABSTRACT

A high temperature water-cooled gas-tight lubricated steel plug valve for handling abrasive particulates (such as iron ore or sponge iron) having a water-cooled hollow double-walled housing with opposing inlet and outlet, a hollow internally-baffled axially water-cooled cylindrical plug with a transverse flow pipe defining a bore therethrough, at least one relatively thin-walled replaceable iron wear liner of generally cylindrical shape having corresponding bore passages and being positioned around said plug member and fixedly keyed within said housing whereby wear is generally limited to the relatively-moving interfacing inner surface of the wear liner and the outer surface of the plug member. The plug being machinable to restore the proper shape and tolerances when combined with replacement of the wear liner by one of compensatingly greater thickness. In a second embodiment, the one wear member may be fixed to the outer surface of the plug member, whereby any wear occurs between the outer surface of the wear liner and the inner surface of the housing. In a third embodiment for low temperature applications, two replaceable wear liners are used, one fixed to the housing and one fixed to the plug member where the abrasive action of the solids affects only the meeting surfaces of the two concentrically mounted wear liners.

5 Claims, 5 Drawing Sheets

PLUG VALVE

FIELD OF THE INVENTION

The present invention relates to a gas-tight sealing plug valve which is specially fitted for use in environments where abrasive materials are handled at ambient and high temperatures, above 400° C. The construction of this plug valve is also useful in combination with a solids cut-off valve for feeding to or removing abrasive particulate materials from a pressurized vessel while providing an effective seal between different gaseous atmospheres and pressures at each side of said valve in such industrial installations as a direct reduction reactor system, a coal gasification system, or the like.

BACKGROUND OF THE INVENTION

U.S. Pat. No. 3,710,808 to Celada et al. describes a valve assembly comprising a plug valve which has been used for years in direct reduction plants with very good results. This relies on a combination of two separate valve elements; one element (66) to shut off the solid particles flow and one sealing plug (86) to effect the gas-tight seal. By opening the pressure-sealing valve (86) before the solids flow regulating valve (66) is opened and by closing the flow regulating valve before the sealing valve is closed, the sealing surfaces of the sealing valve can be protected from the erosive effect of the abrasive particles passing through the valve assembly. The gas-tight seal is effected by means of a lubricating grease periodically injected to the plug surface. An improvement to the valve assembly described in Celada is disclosed in U.S. Pat. No. 4,498,498 to Martinez-Vera et al. This patent shows a modification of the plug valve comprising improved means for lubricating the gas sealing valve component.

Usually the plug valves used in handling sponge iron pellets or similar abrasive particles have to be withdrawn from use after a period of several months (typically less than a year). At that time, the sealing surface in the valve body is machined to provide a new smooth sealing surface, and in order to maintain a reliable seal, a new replacement plug must be made with specific and precise modified dimensions (so as to comply with the tolerances and strict gaps necessary for an effective gas seal).

Neither of these two patents teaches or suggests any measure for easily repairing or reconstructing the valve sealing surfaces after a period of use and wear by the abrasive materials. The above prior art patents do not disclose either a wear sleeve (to permit reuse of the originals of both the housing and plug of the valve). Nor do they disclose a structure with cooling means for maintaining the plug valves operable over time under high temperatures (when each component of the valve changes its dimensions because of the different temperature exposure and heating, which may cause failures and difficulties in operation of the plug valve).

OBJECTS AND SUMMARY OF THE INVENTION

It is therefore an object of the present invention to provide an improved plug valve structure for use in environments where granular abrasive materials are handled.

It is another object of the invention to provide an improved plug valve structure for use in environments where granular abrasive materials are handled at high temperatures, for example in the gravity feed of particulate iron ore and/or DRI to and from a pressurized reduction reactor, coal gasification or the like.

It is a further object of the invention to provide a valve structure with lower repair and maintenance costs.

Other objects of the invention will be in part obvious and in part pointed out hereinafter.

In general the objects of the invention are achieved by providing a lubricated plug valve capable of producing gas sealing in environments where abrasive particulate materials pass through said valve, comprising a housing with a plug member having at least one and at most two coaxial wear member sleeves positioned between and fixed to at least one of said housing and said plug member. In a preferred embodiment said housing has an inlet, and an outlet generally opposite to said inlet; a plug member, generally shaped as a cylinder, having a sealing surface which engages with a corresponding sealing surface inside said housing, said plug member having a bore passage therethrough and being movably mounted within said housing from an open position, where said bore passage registers with said inlet, to a closed position where said plug member seals said bore passage; a wear member of generally cylindrical shape, located around said plug member and inside said housing and having at least two openings corresponding to and registering with said inlet and said outlet of the housing; and means for maintaining said wear member in a fixed position inside the housing to prevent it from blocking said inlet or said outlet of the housing, whereby, in order to maintain the gas sealing capability of the valve after said sealing surfaces wear due to extended use in abrasive environments, said wear member is replaced for another wear member of greater thickness.

The plug member is preferably hollow and baffled with axial flow passages for circulating water or other cooling fluid. Said housing being doubled walled and similarly cooled by a flow of liquid therebetween.

BRIEF DESCRIPTION OF THE DRAWINGS

In this specification and in the accompanying drawings, some preferred embodiments of the invention are shown and described and various alternatives and modifications thereof have been suggested; but it is to be understood that other changes and modifications can be made within the scope of the invention. The suggestions herein are selected and included for purposes of illustration in order that others skilled in the art will more fully understand the invention and the principles thereof and will thus be enabled to modify it in a variety of forms, each as may be best suited to the conditions of a particular use.

DETAILED DESCRIPTION OF THE INVENTION

Figure 1:
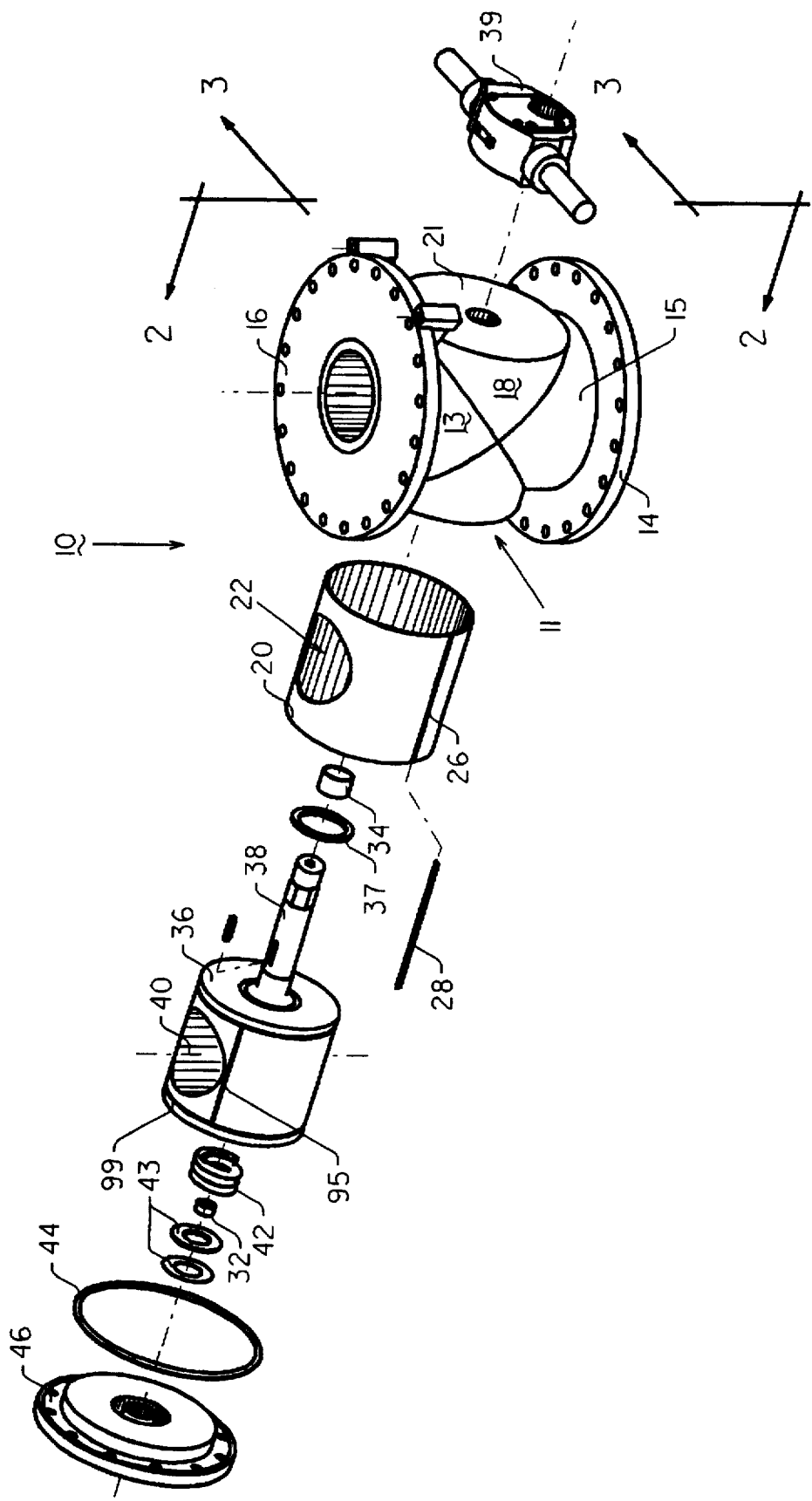
FIG. 1 is a partially schematic exploded isometric view of a valve constructed according to a preferred embodiment of the present invention, showing the general structure thereof as oriented in the "open" position.

Referring to FIG. 1, numeral 10 generally designates a valve according to the present invention, described herein for applications at high temperatures in a direct reduction reactor system, comprising a valve housing 11 primarily formed of a first (central) cylindrical body 18, made of steel, with one end 21 preferably permanently closed, and a removable cover 46 bolted to the other end, and being sized to position the cylindrical plug member 36 therein. A replaceable wear member 20 advantageously of a thickness of about 4 to 8 mm, and preferably made of a material different from the type of steel of which the remainder of the valve is made (such as for example nodular iron, to reduce wear by avoiding rubbing of steel surfaces against each other at very close tolerances), is fitted with close tolerances within said housing between the first cylindrical body 18 and the plug 36. This member 20 can be advantageously machined from a section of standard iron pipe. The housing 11 further includes second cylindrical concentric shapes having a common axis perpendicularly intersecting the axis of the first cylindrical body 18 (with the internal portion of the second cylindrical shape being formed of cylindrical pipe sections 17 and 19 and the external portion of the second cylindrical shape being formed of larger cylindrical pipe sections 13 and 17). Flanges 14 and 16 are joined to cylindrical pipe sections 15 & 19 and 13 & 17, respectively, for suitable connection of the valve 10 with piping or other elements of the process where it is being used.

The wear member 20 has suitable openings 22 and 23 which register with inlet 24 and outlet 25 of the valve (defined respectively by pipe sections 17 and 19). In the first preferred embodiment, the wear member 20 is fixed within the housing 11 (advantageously by a gas-tight press fit). A key 28 is provided for preventing said member 20 from rotating and thus losing the alignment with the inlet-outlet axis 24-25 of the valve. The key 28 is snugly housed in keyway 26 slotted into the outer surface of member 20 and in a corresponding keyway 27 slotted into the inner surface of the central cylindrical body 18 (see FIG. 3).

In a second embodiment, the wear member 20 (see FIG. 1) is fixed upon the plug 36 such that the openings 22 and 23 of the wear member 20 are always aligned with the plug bore 40, and the plug 36 and member 20 rotate as a unit. If the key 28 is used, it would be positioned between the wear member 20 and the plug 36 in aligned keyways in the facing surface of each. In the second embodiment, the inner surface of the housing 11 would have to be machined, a usually more difficult procedure than machining the outer surface of the plug 36.

Figure 5:
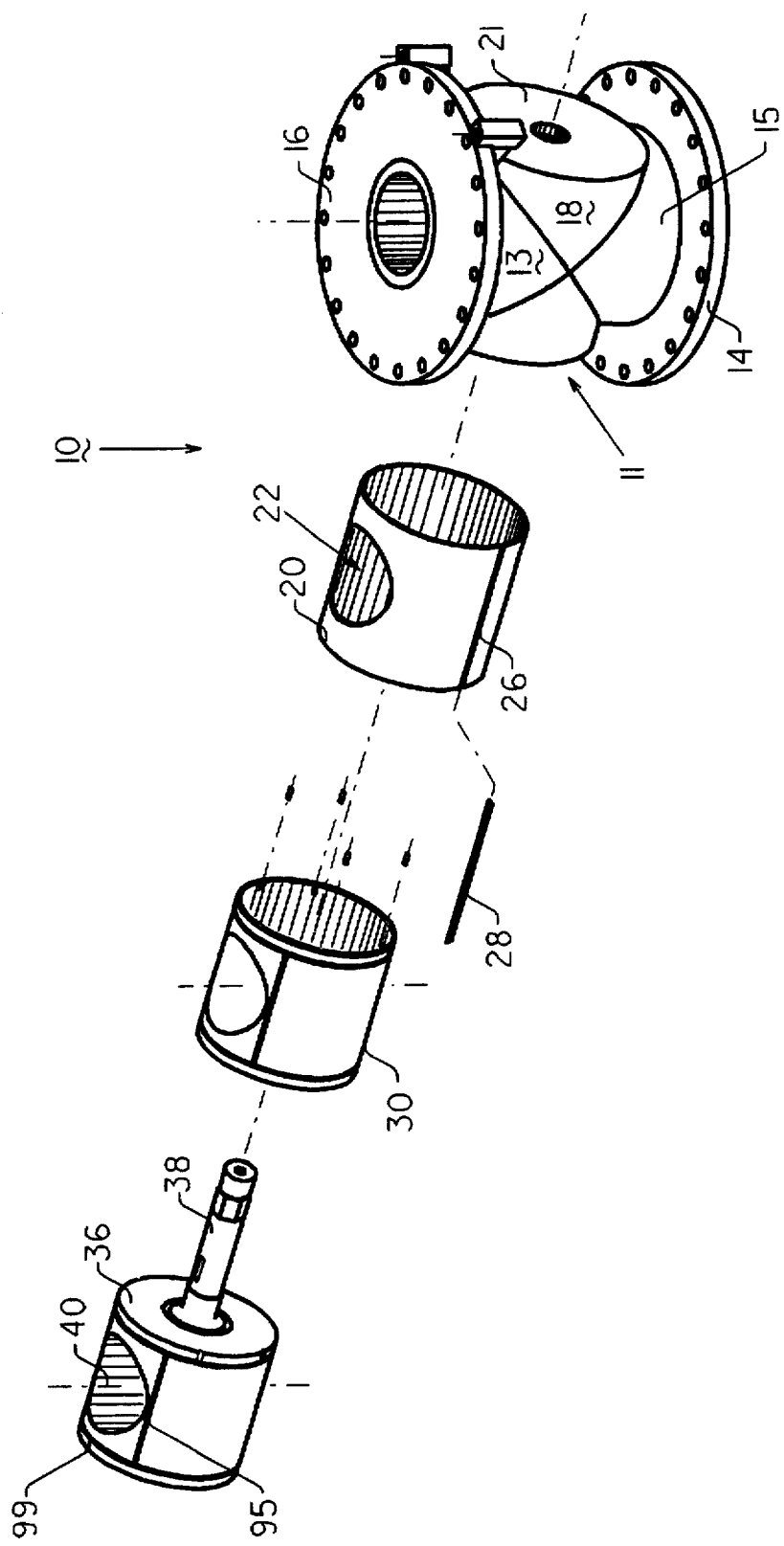
FIG. 5 is a partially schematic simplified view, similar to FIG. 4, of a modified embodiment of the invention wherein two wear sleeves (in lieu of just one) are illustrated.

In yet another variation of the invention, in one of its broader aspects, two coaxially overlapping wear sleeves interfitting with close tolerance could be used (as illustrated in FIG. 5), one 20 fixed gas-tight within the housing 11 and the other 30 fixed gas-tight over the plug 36. However, in the latter case, experience indicates that this variation is best for lower, near ambient, temperature service (since the multiple gap interfaces resulting from the use of dual sleeves would normally result in uneven expansions and contractions at a given time within the valve assembly). This dual wear sleeve modification has the advantage that no machining of either the plug 36 or the housing 11 would be needed. However, lubrication of the relatively moving surfaces could be complicated. Also stocking and/or fabricating a set of two interfitting sleeves could be more difficult than merely machining the outer surface of the plug 36 (as is done in the first illustrated preferred embodiment).

Plug valves operating with abrasive materials need to be repaired after a certain period of use because the mating surfaces of the plug and the housing of valves are abraded and become worn by action of the solid particles. It is then necessary to machine the internal surface of the housing, thus increasing its internal diameter and to provide a new plug having a correspondingly larger diameter in order to re-establish the necessary close tolerances. If the abraded surface of the plug were to be renewed by machining to re-establish a true cylindrical shape, it would end up with a still smaller diameter and the resulting even greater gap between the housing and the plug 36 would be even more unacceptable. This existing standard procedure is costly, because the otherwise still-serviceable plug has to be scrapped and replaced by an entirely new replacement plug.

According to the first embodiment of the present invention, the wear caused by the abrasive materials relative to the housing occurs instead on the simple cylindrical wear member 20 (which is inexpensive and can be readily substituted by a new one at a considerably lower cost, after the machining of the plug). According to such invention no repair work has to be done on the valve housing and the gap necessary for gas sealing between the plug 36 and the wear member 20 is easily re-established by providing a new wear member 20 of the required increased thickness.

In the illustrated embodiment, the plug 36 with a bore 40 is rotated by shaft 38, within bushings 32 and 34, advantageously by means of a suitable motorized actuator 39. A spring 42 seated against washers 43 maintains the plug 36 against O-ring 37 of closed end 21 to give the right axial alignment of the bore 40 so as to register with the inlet 24 and outlet 25 of the valve 11 after each rotation of the plug 36. A gasket 44 and the cover 46 closes the central cylindrical body 18 (which serves as the main portion of the valve housing 11).

Figure 2:
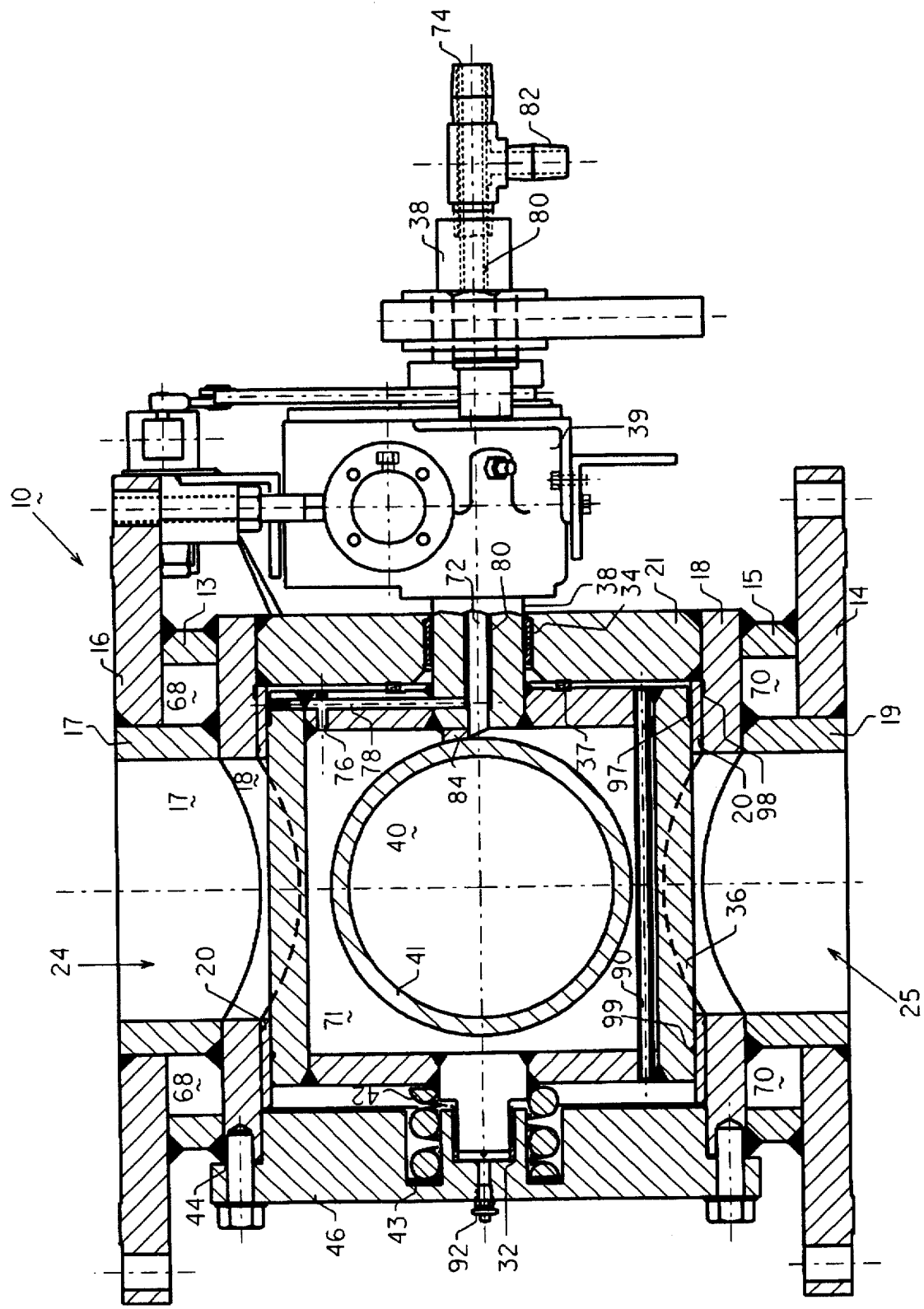
FIG. 2 is a partially schematic vertical sectional view as though taken along line 2—2 of the assembled valve of FIG. 1 shown in the "closed" position and illustrating the location and placement of the wear member of the valve and its cooperative relationship therein.
Figure 3:
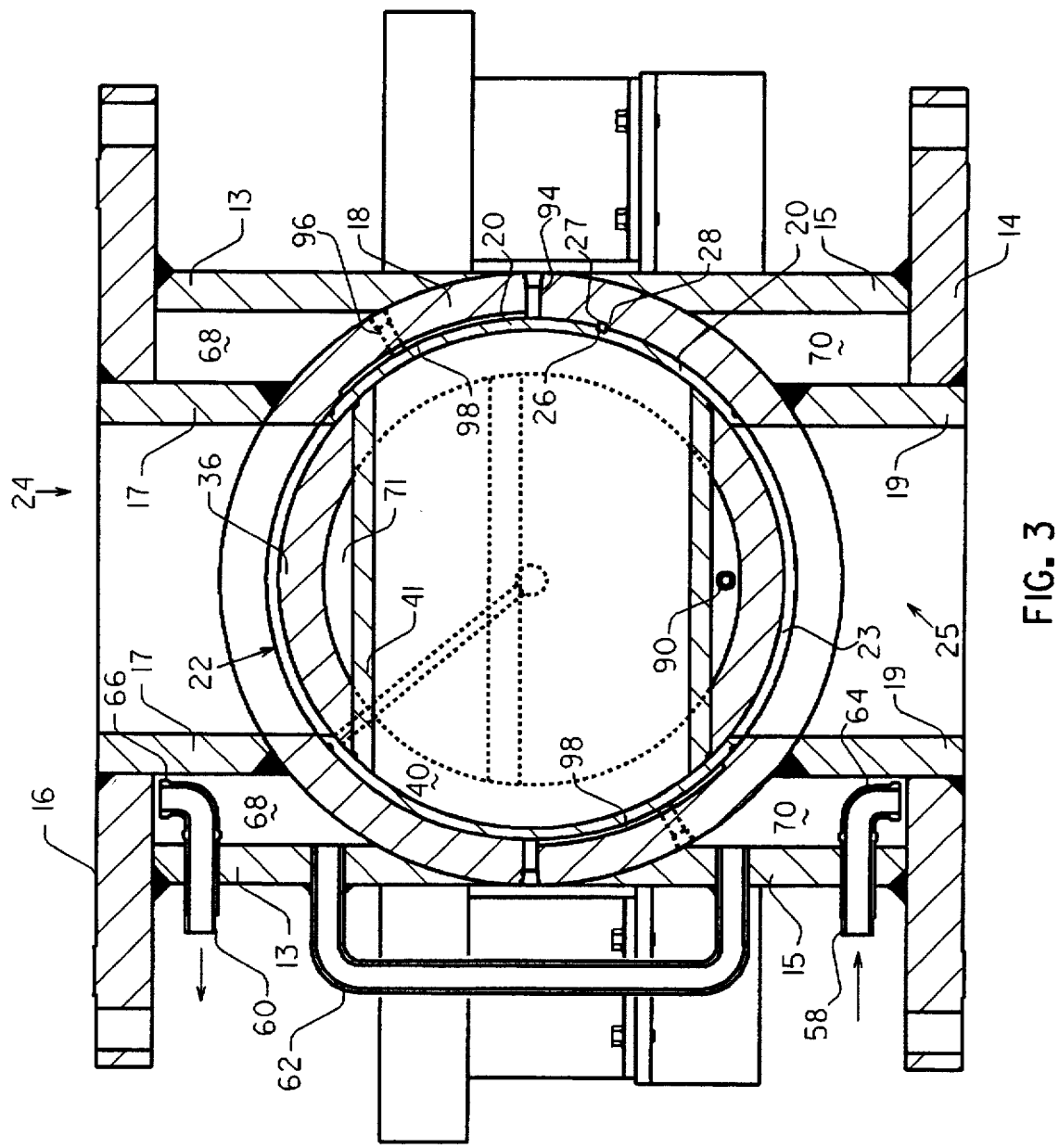
FIG. 3 is a partially schematic vertical sectional view as though taken along line 3—3 of the assembled valve of FIG. 1 shown in the "closed" position and illustrating the location and placement of the wear member of the valve and its cooperative relationship therein.
Figure 4:
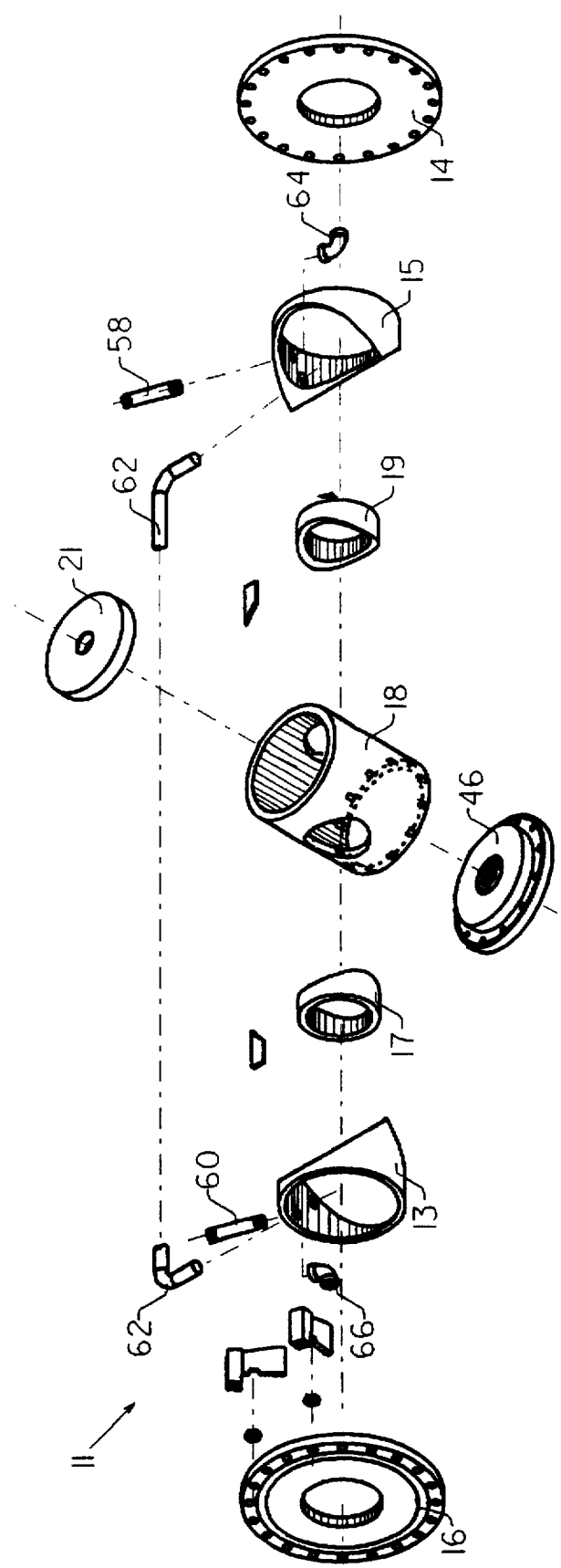
FIG. 4 is a partially schematic exploded isometric view of the construction of the housing of the valve (oriented 90° from the view in FIG. 1).

Reference is now made to FIGS. 2, 3 and 4, where the valve 10 is described for high temperature applications. Water cooled chambers 68 and 70 are formed at each side of the central housing body 18 by providing cylindrical sections 17 and 19 as inner walls and sections 13 and 15 as external walls for said cooling chambers. Inlet pipe 58 provided with elbow 64 leads cooling water into the bottom of the cooling chamber 70. An external pipe 62 connects cooling chamber 70 with cooling chamber 68. The cooling water is ultimately withdrawn from the top of said chamber 68 through elbow 66 and outlet pipe 60. This structure of the cooling chambers for the valve housing is simple and of low cost in its fabrication, avoiding complex internal passages embedded in the body. It will be evident that both chambers 68 and 70 can be supplied with cooling water with separate inlet and outlet pipes, if it is preferred.

The hollow plug 36 has an internal cooling chamber 71 to which cooling water is fed through pipe 72 coaxially positioned within hollow shaft 38 and having a connection 74 to a suitable cooling water source (not shown). Cooling water fills chamber 71 and flows through orifice 76 and then through passage 78 and is withdrawn through annular passage 80 formed in the shaft 38 by inlet pipe 72 and the bore in the shaft. Finally, water flows out of the plug through outlet connection 82. A baffle 84 prevents the cooling water from short-circuiting its flow path around the plug pipe 41 forming the internal passage 40 for hot solids.

Passage 90 (see FIGS. 2 and 3) is provided axially through the plug member 36 for equalizing the pressure on both sides of said plug thus avoiding unwanted axial displacement of the plug or other stresses thereon which might result from pressure differentials within the valve housing.

Several passages or grooves (such as 95, 97, and 99) are provided in the surface of plug 36 and elsewhere for distribution of the sealing and lubrication grease supplied at nipples 92, 94 and 96, and other grease nipples not shown, as practiced in the art. Three passages are noted so as not to be confused with the cooling fluid passages 72, 76, 78, etc. The grease also passes through suitable passages in the wear sleeve 20, not shown for simplicity of the drawing, to the surface of the wear sleeve 20 in contact with plug member 36.

From the foregoing description, it should be apparent that the present invention provides a valve capable of yielding the advantages outlined at the beginning of the present specification. It is of course, to be understood that the foregoing description is intended to be illustrative, and that numerous modifications can be made within the scope of the invention. For example, the valve can be constructed without the water cooling chambers for low temperatures applications with the advantages of low repair costs and simplified construction. The valve according to the present invention provides a number of advantages and fulfills a current need in applications of high temperature abrasive materials, for example iron ore, direct reduced iron (DRI), coal and other particulate solid materials processed under high pressures where effective isolation of noxious or flammable gases as hydrogen and carbon monoxide must be provided; although the invention can also advantageously used in other applications at low pressures or to carry out processes under vacuum conditions. Other modifications within the scope of the invention will be apparent to those skilled in the art.

Although the invention will be described as applied to direct reduction processes, it will be evident to those skilled in the art that it can be utilized and provide advantages in other similar applications of pressure vessels at low and high temperatures and pressures above and below the atmospheric pressure.

What is claimed is:

1. A high temperature high-pressure water-cooled lubricated gas-tight steel plug valve adapted for controlling hot abrasive particulate materials passing through said valve, comprising a water-cooled hollow double-walled housing having an inlet passage and an outlet passage generally opposite to said inlet passage; the double walls of said housing form at least one hollow interior having cooling fluid inlet and outlet pipes; a generally cylindrical hollow plug having a bore passage therethrough, having at least one axial stem, and being rotatably mounted with close tolerances within said housing from an open position, where said bore passage registers with said inlet and said outlet passages, to a gas-tight closed position out of registry therewith; said bore passage being formed of a transverse pipe within said plug; a baffle positioned within said plug and along said pipe so as to block flow of cooling fluid past said baffle around said pipe within said hollow plug, within one axial stem an inlet axial flow passage positioned to feed cooling fluid to one side of said baffle and an outlet axial flow passage positioned to withdraw feed cooling fluid from the other side of said baffle; at least one relatively thin-walled replaceable iron wear liner of a wholly cylindrical hollow shape, located surrounding said plug member and inside said housing; any such wear liner having at least two openings corresponding to and shaped to register with said inlet and said outlet passages of the housing; there being no more than two such wear liners; said at least one replaceable wear liner being fixed gas-tight to one of said plug and said housing and being in gas-tight engagement with the other of said plug and said housing together with any single wear liner which may be fixed on such other, said valve being so structured and any such liner being so positioned in such a manner that any such liner is capable of being cooled by cooling fluid circulating in said housing and in said plug sufficiently to prevent differential expansion between the iron of any wear liner therein and the steel of the remainder of the valve.

2. A lubricated plug valve according to claim 1, wherein said at least one wear liner is press-fit into said housing, is keyed therein to prevent rotation relative to the housing, and directly engages in by their respective relatively rotatable sealing surfaces said plug.

3. A lubricated plug valve according to claim 2, further comprising means for supplying lubricant and sealing grease to the relatively moveable sealing surfaces within said valve.

4. A lubricated plug valve according to claim 1, wherein said at least one wear liner is fixed to said plug and engages in sealing, relatively rotatable, relationship with said housing.

5. A lubricated plug valve according to claim 1, comprising a second relatively thin-walled replaceable iron wear liner also being of a wholly cylindrical hollow shape, one wear liner being fixed with respect to said housing and engaging concentrically in sealing relationship with the other such wear liner member, which latter is fixed with respect to said plug.

* * * * *